(12) United States Patent
Caffa et al.

(10) Patent No.: US 11,162,853 B2
(45) Date of Patent: Nov. 2, 2021

(54) ASSEMBLY FOR MEASURING TORQUE AND/OR AXIAL LOAD FOR CAPPING HEADS

(71) Applicant: AROL S.P.A., Canelli (IT)

(72) Inventors: Marco Caffa, Canelli (IT); Marco Cipriani, Canelli (IT); Alberto Cirio, Canelli (IT)

(73) Assignee: AROL S.P.A., Canelli (IT)

( * ) Notice: Subject to any disclaimer, the term of this patent is extended or adjusted under 35 U.S.C. 154(b) by 154 days.

(21) Appl. No.: 16/481,789

(22) PCT Filed: Jan. 31, 2018

(86) PCT No.: PCT/IB2018/050586
§ 371 (c)(1),
(2) Date: Jul. 29, 2019

(87) PCT Pub. No.: WO2018/142290
PCT Pub. Date: Aug. 9, 2018

(65) Prior Publication Data
US 2020/0025636 A1    Jan. 23, 2020

(30) Foreign Application Priority Data
Feb. 1, 2017    (IT) .................. 102017000011057

(51) Int. Cl.
*G01L 3/00*    (2006.01)
*G01L 3/14*    (2006.01)
(Continued)

(52) U.S. Cl.
CPC ................. *G01L 3/14* (2013.01); *G01L 5/24* (2013.01); *G01L 5/0042* (2013.01); *G01N 2291/02827* (2013.01)

(58) Field of Classification Search
CPC ........... G01L 3/14; G01L 5/24; G01L 5/0042; G01N 2291/02827
See application file for complete search history.

(56) References Cited

U.S. PATENT DOCUMENTS 6,871,482 B2    3/2005    Cirio
6,925,897 B2    8/2005    Cirio
(Continued)

FOREIGN PATENT DOCUMENTS

CN    1208852 A    2/1999
CN    102139848 A    8/2011
(Continued)

*Primary Examiner* — Max H Noori
(74) *Attorney, Agent, or Firm* — Howson & Howson LLP

(57) ABSTRACT

An assembly for measuring torque and/or axial load for capping heads includes a containing body torque and/or load sensor housed within the body, and an interface that connects a capping head to the body. The interface is coupled to the torque/load sensor to transfer torque applied on the interface to the torque sensor and/or to transfer load applied on the interface to the load sensor. The interface has a first part fixedly constrained to the capping head such that the first part is brought into rotation and/or translation by the capping head, and a second part coupled to the torque sensor for transferring a torque thereto and/or to the load sensor for transferring a load thereto. The torque and/or load are applied by the first part to the second part and the first part transfers a torque to the second part in the absence of a reciprocal contact.

10 Claims, 3 Drawing Sheets

(51) Int. Cl.
*G01L 5/24* (2006.01)
*G01L 5/00* (2006.01)

(56) References Cited

U.S. PATENT DOCUMENTS

| | | | |
|---|---|---|---|
| 7,347,032 | B2 | 3/2008 | Cirio |
| 7,353,643 | B2 | 4/2008 | Cirio |
| 7,377,085 | B2 | 5/2008 | Cirio |
| 7,481,122 | B2 | 1/2009 | Searle |
| 7,533,590 | B2 | 5/2009 | Cirio |
| 7,647,746 | B2 | 1/2010 | Ueda et al. |
| 7,685,796 | B2 | 3/2010 | Capelli et al. |
| 8,375,683 | B2 | 2/2013 | Knieling et al. |
| 8,439,413 | B2 | 5/2013 | Cirio |
| 8,561,377 | B2 | 10/2013 | Cirio |
| 9,266,706 | B2 | 2/2016 | Forestelli et al. |
| 9,296,599 | B2 | 3/2016 | Forestelli et al. |
| 9,352,361 | B2 | 5/2016 | Cirio |
| 9,623,990 | B2 * | 4/2017 | Cirio ............... B67B 3/2033 |
| 10,874,591 | B2 * | 12/2020 | Taylor ............... G16H 20/10 |
| 2004/0007554 | A1 * | 1/2004 | Ribi ............... B67B 7/24 215/200 |
| 2006/0162285 | A1 * | 7/2006 | Haynes ............... G01L 5/0042 53/317 |
| 2010/0289200 | A1 * | 11/2010 | Fukui ............... H02K 55/02 269/8 |
| 2012/0017539 | A1 | 1/2012 | Neufeld et al. |
| 2012/0240519 | A1 * | 9/2012 | Forestelli ............... B67B 3/261 53/284.5 |
| 2012/0247064 | A1 | 10/2012 | Forestelli et al. |
| 2014/0034087 | A1 * | 2/2014 | Susalla ............... B08B 9/093 134/24 |
| 2015/0375890 | A1 | 12/2015 | Ruan |
| 2016/0152457 | A1 * | 6/2016 | Godet ............... B67C 3/007 53/440 |
| 2016/0313167 | A1 * | 10/2016 | Li ............... B65D 51/24 |
| 2018/0165804 | A1 * | 6/2018 | Sakakibara ............... G01B 9/02017 |
| 2019/0177145 | A1 | 6/2019 | Caffa et al. |
| 2019/0295445 | A1 * | 9/2019 | Littman ............... G09F 3/0317 |

FOREIGN PATENT DOCUMENTS

| | | |
|---|---|---|
| EP | 1186873 A1 | 3/2002 |
| EP | 1923683 A1 | 5/2008 |

* cited by examiner

ASSEMBLY FOR MEASURING TORQUE AND/OR AXIAL LOAD FOR CAPPING HEADS

The present invention relates to an assembly for measuring torque and/or axial load for capping heads generally used for applying caps on containers or bottles. More particularly, the present invention concerns an assembly for measuring the tightening torque and the axial load applied by a capping head while it is applying a cap on a container.

Capping heads are devices allowing tightly sealing a cap or plug on the mouth of containers or bottles, for instance of the kind intended for containing foodstuffs such as beverages. To this end, they comprise gripping means arranged to arrive into engagement with a cap and then to convey it in correspondence of the neck of a container and subsequently to apply to the cap a rotation causing cap screwing onto a threaded portion of said neck and/or an axial force, until a tightened condition is achieved.

In case of screwing, the capping head continues applying a torque until attaining a threshold torque value corresponding to the tightening torque set. Actually, the capping head is set either electrically by means of a rotary actuator, or mechanically by means of a magnetic clutch, so that it cannot apply torques exceeding the tightening torque.

During capping of the container, an axial load, also referred to as "top load", having a predetermined value is also applied on the cap, for instance through the action of a preloaded spring or by means of suitable linear actuators.

In order to check the proper operation of the capping head during application of the tightening torque and/or the axial load that have been set, it is known to use a measuring instrument known as "dynamometric bottle" or "gold bottle". Such an instrument has a bottle-shaped body, allowing positioning it in place of a container to be capped, in order to test in this manner the torque and the axial load applied by the specific capping head.

An interface, which is cap-shaped in order it can be coupled with the cap gripping means provided on the head to be tested, is fastened on top the bottle-shaped body. The cap-shaped interface is connected to a plurality of sensors located inside the bottle-shaped body, in such a manner as to transfer the torque and/or the axial load applied by the capping head onto the same interface to the sensors.

Referring in particular to the torque measurement, such sensors can either detect only the value of the predetermined threshold torque or, in the alternative, measure the torque in continuous manner, thereby acquiring the torque behaviour during the whole cycle for subsequent analyses.

However, the prior art solutions are not devoid of drawbacks. Actually, the Applicant has noticed that the measure provided by the prior art measuring instruments is strongly affected by the coupling between the gripping means of the capping head and the cap-shaped interface fastened to the body of the measuring instrument. Such parts are centred on independent structures, which are subject to clearances and tolerances. Thus, they can rotate about axes which are not perfectly mutually parallel or aligned.

Moreover, the Applicant has also realised that the misalignment of the two movements results in spurious angular moments, which give rise to measurement errors of either static type (offsets) or dynamic type, the latter being due to the rotation periodicities. Moreover, the combination of the rotational components with the longitudinal components of the axial load causes measurement anomalies due to the superimposition of measurements of physical quantities with positioning and setting errors.

Thus, the problem upon which the present invention is based is to provide an assembly for measuring torque and/or axial load for capping heads, which is capable of providing in dynamic manner robust measures that, in particular, are scarcely affected by inaccuracies in the relative positioning of the capping head and the measuring assembly itself.

Within such a problem, it is an object of the present invention to conceive an assembly for measuring torque and/or axial load for capping heads, which constantly ensures a precise alignment between the capping head and the measuring assembly itself.

More particularly, it is another object of the present invention to provide an assembly for measuring torque and/or axial load for capping heads, which is capable of providing accurate measures, which are not affected by the coupling with the capping head.

In accordance with a first aspect thereof, the invention therefore concerns an assembly for measuring torque and/or axial load for capping heads, comprising a containing body, at least one torque sensor and/or at least one load sensor housed within the containing body, and interface means adapted to connect a capping head with the containing body, such interface means being coupled to the at least one torque sensor and/or to the at least one load sensor in a manner which is suitable to transfer a torque applied on the interface means to the at least one torque sensor and/or to transfer a load applied on the interface means to the at least one load sensor, characterised in that the interface means comprise at least a first part, which is fixedly constrainable to the capping head in such a way that the first part is brought into rotation and/or translation by the capping head, and a second part, which is coupled to the at least one torque sensor for transferring a torque thereto and/or to the at least one load sensor for transferring a load thereto, which torque and load are applied by the first part of the interface means to the second part of the interface means, wherein the first part of the interface means is suitable to transfer a torque to the second part of the interface means in the absence of a mutual contact.

The Applicant has perceived that the measurement errors or inaccuracies characterising the prior art devices are mainly due to the contact interaction (due to direct or indirect contact) between the sensors and the external member (specifically, the capping head) applying the torque and the load to the device.

Therefore, the Applicant has studied a suitable interface capable of transferring to the sensors the torque applied to the interface itself from the outside, without any reciprocal contact between such elements or between parts respectively connected to such elements.

Actually, the Applicant has realised that, through such an interface, it is advantageously possible to obtain a measure devoid of distortions due to the possible inaccuracies in the form, the coupling or the alignment between the parts interacting during measurement.

Moreover, the Applicant has noticed that, through the contactless torque transfer, the measure is advantageously much more robust, since it is neither subjected to frictions or other effects capable of introducing distortions into the measure.

The present invention may have at least one of the following preferred features, which in particular can be combined together at will in order to cope with specific application requirements.

Preferably, the first part of the interface means can be magnetically coupled to the second part of the interface means for transferring a torque thereto.

Advantageously, the magnetic coupling between the first and the second part of the interface means allows effectively and precisely transferring a torque from one part to the other in the absence of a reciprocal contact. This allows performing highly precise and repeatable measurements, substantially without wear of the interface.

More preferably, the second part of the interface means is cup-shaped, thereby defining a seat for receiving the first part of the interface means.

Preferably, the first part of the interface means is shaped as a cylindrical pin, the pin-shaped first part being dimensioned so as to fit in the receiving seat, defined by the cup-shaped second part.

Such a construction is particularly convenient since, on the one side, it its very simple to construct, and on the other side it allows gradually adjusting the magnetic coupling between the first and the second part of the interface means. In this manner, it is possible to perform torque measurements within a continuous range of values to which the capping heads are set.

Preferably, the first part of the interface means is arranged to be fastened to a capping head in place of the gripping means of the head itself.

Conveniently, this allows making the measurement independent of the particular shape of the cap handled by each capping head. Moreover, modifying the capping head for the measurement is particularly easy. Indeed, it will be sufficient to remove the gripping means of the capping head and to connect the first part of the interface means in their place.

In the alternative, the first part of the interface means is arranged to be inserted into and retained in the gripping means of the capping head.

According to such an alternative, it is advantageously even simpler and faster preparing the capping head for the measurement, i.e. to predispose the head so that the first part of the interface means is made to rotate and translate by the capping head. Actually, in case the first part is externally cap-shaped, this only requires that such first part is inserted into and retained in the gripping means of the capping head in conventional manner.

More preferably, the first and/or the second part of the interface means comprise a plurality of permanent magnets arranged with alternate polarities along the ring-shaped development of, respectively, an outer covering surface of the pin-shaped first part, and/or of a covering surface of the cup-shaped second part, facing the inside of the receiving seat.

Even more preferably, the first or the second part of the interface means comprise a permanent magnet, shaped as a hollow cylindrical ring, which projects from the outer covering surface of the pin-shaped first part or from the covering surface of the cup-shaped second part facing the inside of the receiving seat, respectively.

Preferably, the permanent magnets are made of a samarium-cobalt alloy and/or of a neodymium-iron-boron alloy and/or of an aluminium-nickel-cobalt alloy.

In the alternative, the first or the second part of the interface means are made of a ferromagnetic material, subject to hysteresis friction.

Preferably, the ferromagnetic material is an aluminium-nickel-cobalt alloy.

Preferably, the first and the second part of the interface means comprise means for reciprocal alignment or centring.

Advantageously, the provision of centring means ensures an aligned positioning of both parts forming the interface means, by eliminating offset and positioning errors.

More preferably, the means for reciprocal alignment comprise a centring protrusion axially extending from the centre of a free head surface of the pin-shaped first part and an entrance recess formed in a bottom wall of the receiving seat, the entrance recess being shaped in a complementary way with respect to the centring protrusion for internally receiving such protrusion.

In the alternative, the means for reciprocal alignment comprise a centring protrusion axially extending from the centre of a bottom wall of the receiving seat, and an entrance recess formed in a free head surface of the pin-shaped first part, the entrance recess being shaped in a complementary way with respect to the centring protrusion for internally receiving such protrusion.

Both such alternative embodiments conveniently ensure that not only a perfect alignment of both parts forming the interface means is obtained, but also that the load is additionally transferred perfectly in-axis and hence the measurement thereof is particularly precise.

Moreover, such means obtain centring in a manner that is simple, immediate and compatible with the conventional positioning of a container on a conveyor.

Preferably, the at least one load sensor is a three-axis sensor.

In the alternative, the at least one load sensor is a single-axis sensor, and it is arranged to detect loads applied along the vertical axis.

Preferably, the measuring assembly further includes a plurality of second sensors coupled to the second part of the interface means.

More preferably, the plurality of second sensors comprises at least one sensor selected out of the group consisting of:
  a rotation sensor, preferably of the encoder type;
  a Hall-effect cell;
  a temperature sensor;
  an accelerometric sensor;
  a displacement sensor;
  an eccentricity sensor.

Advantageously, the rotation sensor and the Hall-effect cells allow recording the rotary magnetic variations, with time, of the first part of the interface means while it is approaching the second part, while additionally recording also the slowing-down curve. This advantageously allows detecting eccentricities between the first and the second part of the interface means during such an approach phase.

Advantageously, the accelerometric sensor allows measuring the vibrations of the capping head and, thus, evaluating the ageing of same giving rise to an increase of the clearances and hence of the vibrations, Advantageously, also the displacement sensor allows detecting possible eccentricities between the first and the second part of the interface means, and hence of the capping head under measurement, during the approach and mutual insertion phase.

Preferably, the displacement sensor comprises an even number of magnetic sensors mounted in opposite pairs between the permanent magnets of the second part of the interface means.

Advantageously, during the roto-translational insertion of the first part of the interface means into the second part, the magnetic surface of said first part, while rotating opposite the magnets of the displacement sensor, generates pulses that are read in differential manner and compared again after a rotation by 180°. Such a double reading conveniently allows compensating the common modes and eliminating the field intensity difference of the individual magnets.

Actually, in an ideal condition in which all magnets have the same intensity and the rotor rotates centred on the stator, the value resulting from the sensors is zero. On the contrary, in the presence of clearance or eccentricity, the magnets amplify the attraction and the repulsion thereby creating unbalanced magnetic fields. As a consequence, the resulting differential value (different from zero) is related to the angle of rotation and hence to the displacement of the rotor, thereby providing relative (not absolute) indications about the clearances and the lack of coaxiality.

Moreover, if the load sensor is a three-axis sensor, it is advantageously capable of recording such differences while eliminating the common modes.

Further features and advantages of the present invention will become more apparent from the following detailed description of some preferred embodiments thereof, made with reference to the accompanying drawings.

The different features in the individual configurations can be combined together at will according the preceding description, should the advantages specifically resulting from a particular combination have to be exploited.

Figure 3:
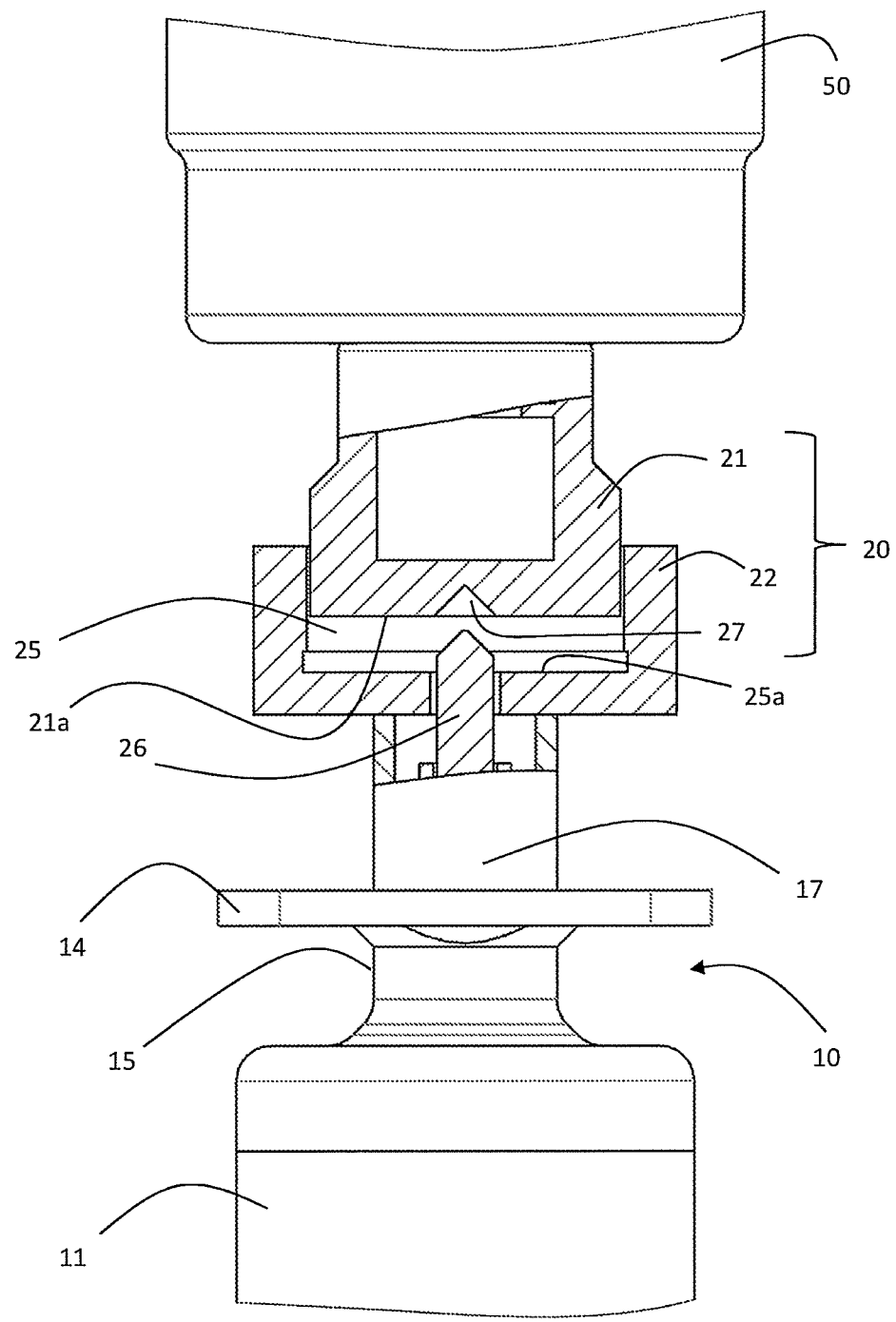

FIG. 3 is a partial view, in side elevation and partly in cross-section, of a second preferred embodiment of an assembly for measuring torque and/or axial load for capping heads, according to the present invention In the following description, for explaining the Figures, the same reference numerals are used to denote constructive elements having the same functions. Moreover, for the sake of clarity of the illustration, it is possible that some reference numerals are not shown in all Figures.

Indications such as "vertical" and "horizontal", "upper" and "lower" (in the absence of further indications) are to be intended with reference to the mounting (or operating) conditions and with reference to the normal terminology in use in the current language, where "vertical" denotes a direction substantially parallel to the direction of the vector force of gravity "g" and "horizontal" denotes a direction perpendicular thereto.

Figure 1:
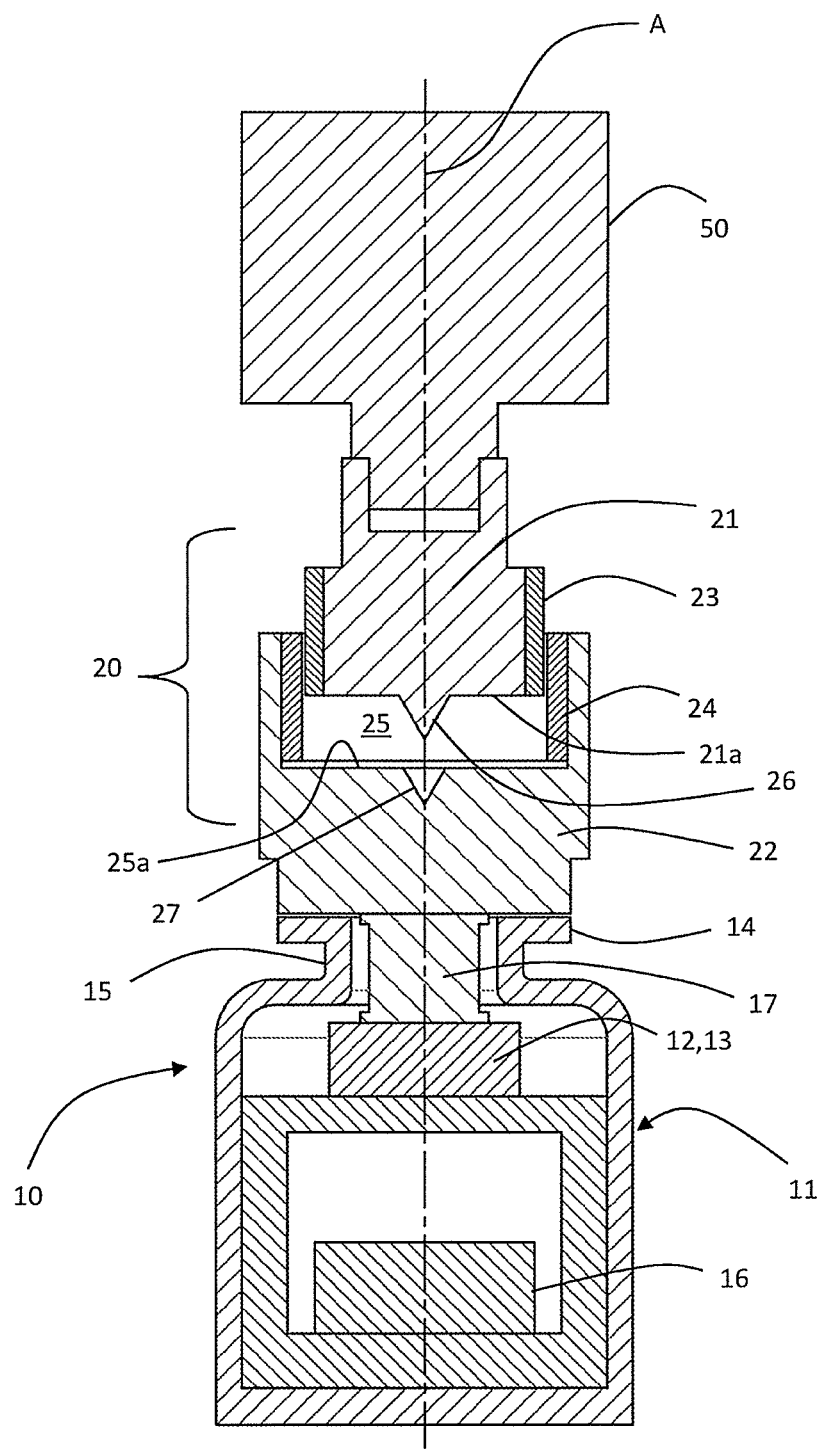
FIG. 1 is a side sectional view of a schematic representation of a first preferred embodiment of an assembly for measuring torque and/or axial load for capping heads, according to the present invention.

Referring to FIG. 1, there is shown a first preferred embodiment of an assembly for measuring torque and/or axial load for capping heads according to the present invention, generally denoted 10.

Measuring assembly 10 includes a containing body 11, preferably having the external shape of a bottle or container in order it can be inserted onto a conveyor arranged to convey containers to be capped in correspondence of a capping head 50 for cap application.

Containing body 11 has a plate-shaped upper end portion 14 and defines, below plate-shaped portion 14, a neck 15 arranged to cooperate with a holding system (not shown), holding measuring assembly 10 in position, thereby making it suitable to perform the measurements.

At least one torque sensor 12 and at least one load sensor 13, of the three-axis type, as well as electronic processing means 16 to which sensors 12, 13 are connected, are provided inside containing body 11 shown in FIG. 1. Electronic processing means 16 are arranged to manage the control of the sensors and they store the measures collected by the sensors.

Interface means 20 arranged to connect a capping head 50 to containing body 11 in a manner suitable to transfer to torque sensor 12 the torque applied by capping head 50 on said interface means 20 upon rotation about an axis A are provided above containing body 11.

Similarly, interface means 20 are arranged to connect capping head 50 to containing body 11 in a manner suitable to transfer to load sensor 13 the axial thrust exerted by capping head 50 on said interface means 20 upon a downward translation along axis A.

To this end, interface means 20 are not fastened to containing body 11, but are directly connected to sensors 12, 13 through a spindle 17. Interface means 20 do no rest on plate-shaped upper end portion 14 of containing body 11, but on said spindle 17.

According to the present invention, interface means 20 comprise a first part 21, which can be fastened to capping head 50 in such a way that said first part is brought into rotation and/or translation by capping head 50, and a second part 22, which is coupled to the at least one torque sensor 12 for transferring a torque thereto and/or to the at least one load sensor 13 for transferring a load thereto, which torque and/or load are applied to the second part 22.

The first part 21 is arranged to transfer a torque to the second part 22 in contactless manner.

In the embodiment shown in FIG. 1, the first part 21 of interface means 20 is shaped as a cylindrical pin, which, once it has been mounted onto capping head 50, symmetrically extends along axis of rotation A of the same cap 50. The outer surface of pin 21 has magnetic characteristics.

In corresponding manner, the second part 22 of interface means 20 is fixedly mounted onto spindle 17 and is generally cup-shaped, thereby defining a seat 25 for receiving pin 21, which seat has a size substantially complementary to the size of cylindrical pin 21 in order to be able to internally accommodate it, yet in contactless manner.

Also the surface facing the inside of receiving seat 25 defined by cup-shaped part 22 has magnetic characteristics, in order to cooperate with the outer surface of pin 21 when the latter is in a configuration partially or wholly inserted in said seat 25.

In the embodiment shown in FIG. 1, the outer surface of cylindrical pin 21 is covered with a ring 23 formed of a plurality of permanent magnets, arranged with alternate polarities along the ring extension, whereas the inner surface of receiving seat 25 is covered with a ring 24 made of a ferromagnetic material subject to hysteresis friction. In order to build the permanent magnets of ring 23 of cylindrical pin 21, use of a material such as a neodymium-iron-boron alloy is particularly suitable, whereas ring 24 covering receiving seat 25 is preferably made of an aluminium-nickel-cobalt ferromagnetic alloy.

Cylindrical pin 21 has a centring protrusion 26 that, when pin 21 is mounted on capping head 50, axially extends from the centre of free head surface 21a of pin 21 towards receiving seat 25.

In mirror-like manner, an entrance recess 27, shaped in complementary way with respect to centring protrusion 26 and shaped so as to internally receive such a protrusion 26, is provided at the centre of bottom wall 25a of receiving seat 25.

Advantageously, centring protrusion 26 and entrance recess 27 have conical shape, in order to make introduction of protrusion 26 into recess 27 easier.

Referring to FIG. 3, there is shown a second preferred embodiment of an assembly for measuring torque and/or axial load for capping heads, which differs from the first embodiment substantially for the reversed positioning of centring protrusion 26 and the corresponding entrance recess 27. Actually, in the embodiment shown in FIG. 3, entrance recess 27 is formed at the centre of free head surface 21a of pin 21, whereas centring protrusion 26 axially extends from the centre of bottom wall 25a of receiving seat 25.

Moreover, in the measuring assembly shown in FIG. 3, spindle 17 connecting interface means 20 and sensors 12, 13 extends from containing body 11 in such a manner as to leave a clearance between plate-shaped upper end portion 14 of containing body 11 and interface means 20.

The operation of measuring assembly 10 according to the invention is as follows.

In order to carry out a measurement of the torque and the axial load imparted by a capping head, the first part 21 of interface means 20 is fastened to said capping head 50 in place of the gripping means (not shown) with which such a head 50 is usually provided.

Thereafter, capping head 50 is actuated, thereby causing a roto-translational movement of pin 21. The movement imparted by capping head 50 on pin 21 makes the pin progressively penetrate into receiving seat 25 defined by the second part 22 of interface means 20.

Figure 2C:
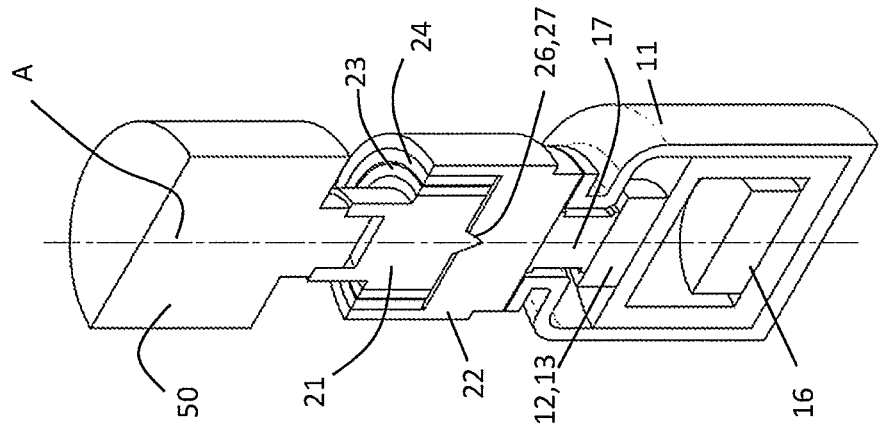
FIGS. 2a to 2c are perspective sectional views of the measuring assembly shown in FIG. 1, in three successive coupling configurations during a measurement phase.
Figure 2B:
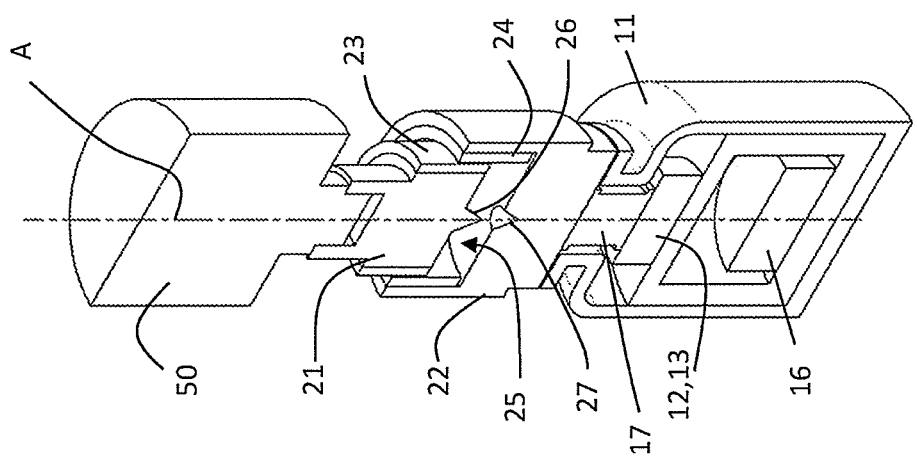
Figure 2A:
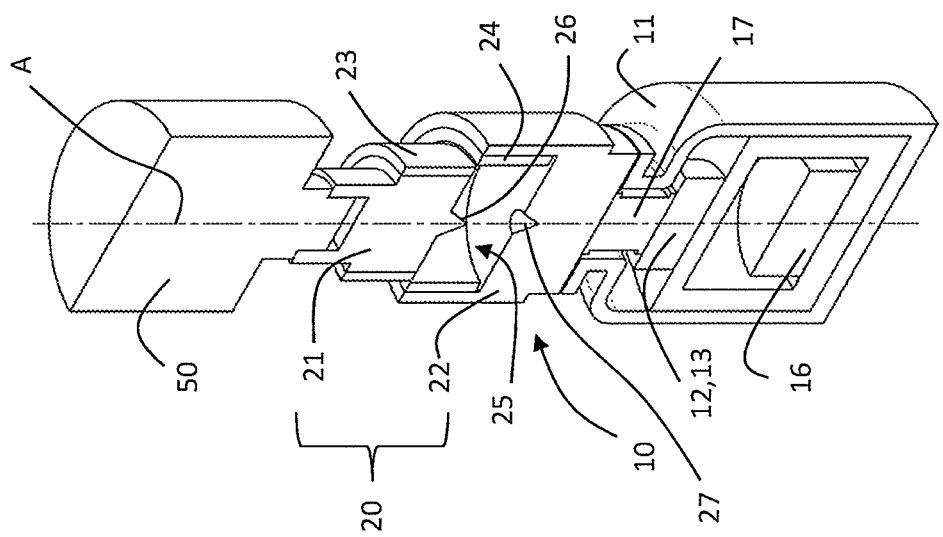

As shown in the sequence of FIGS. 2a to 2c, the first part 21 progressively penetrates in contactless manner into receiving seat 25, thereby magnetically engaging the second part 22 of interface means 20.

When the resistant torque generated by the magnetic coupling between the first and the second part 21, 22 exceeds the tightening torque set for capping head 50 under measurement, the first part 21 stops rotating and transmits in contactless manner the torque to the second part 22, which in turn transmits such a torque to torque sensor 12 it is connected to.

Also centring protrusion 26 progressively engages entrance recess 27, thereby ensuring centring between the first part 21 and the second part 22 of interface means 20.

Moreover, in centred configuration, free head surface 21a of the first part 21 and bottom wall 25a of receiving seat 25 formed in the second part 22 are in contact at least through the coupling between protrusion 26 and recess 27.

In such a contacting configuration, transfer of the load imparted by capping head 50 from the first part 21 to the second part 22 of interface means 20 takes place, whereby the load can be detected by load sensor 13.

The features of the assembly for measuring torque and/or axial load for capping heads according to the present invention are clearly apparent from the above description, as are clearly apparent the relevant advantages.

Further variants of the embodiments described above are possible without departing from the teaching of the invention.

Lastly, it is clear that an assembly for measuring torque and/or axial load for capping heads as conceived can undergo several changes and modifications, all included in the invention. Moreover, all details can be replaced by technically equivalent elements. In practice, any material as well as any size can be used, depending on the technical requirements.

The invention claimed is:

1. An assembly for measuring torque and/or axial load (10) for capping heads, comprising a containing body (11), at least one torque sensor (12) and/or at least one load sensor (13) housed within the containing body (11), and interface means (20) adapted to connect a capping head (50) with the containing body (11), such interface means (20) being coupled to the at least one torque sensor (12) and/or to the at least one load sensor (13) in a manner which is suitable to transfer a torque applied on the interface means (20) to the at least one torque sensor (12) and/or to transfer a load applied on the interface means (20) to the at least one load sensor (13), wherein the interface means (20) comprise at least a first part (21), which is fixedly constrained to the capping head (50) in such a way that the first part (21) is brought into rotation and/or translation by the capping head (50), and a second part (22), which is coupled to the at least one torque sensor (12) for transferring a torque thereto and/or to the at least one load sensor (13) for transferring a load thereto, which torque and/or load are applied by the first part (21) of the interface means (20) to the second part (22) of the interface means (20), wherein the first part (21) of the interface means (20) transfers a torque to the second part (22) of the interface means (20) in the absence of reciprocal contact, and wherein the first part (21) of the interface means (20) is magnetically coupled to the second part (22) of the interface means (20) for transferring a torque to the second part (22).

2. The assembly for measuring torque and/or axial load (10) for capping heads according to claim 1, wherein the first part (21) of the interface means (20) is shaped as a cylindrical pin, the pin-shaped first part (21) being dimensioned so as to fit in the receiving seat (25) defined by the cup-shaped second part (22).

3. The assembly for measuring torque and/or axial load (10) for capping heads according to claim 1, wherein the second part (22) of the interface means (20) is cup-shaped, thereby defining a receiving seat (25) for the first part (21) of the interface means (20).

4. The assembly for measuring torque and/or axial load (10) for capping heads according to claim 3, wherein the first part (21) of the interface means (20) is shaped as a cylindrical pin, the pin-shaped first part (21) being dimensioned so as to fit in the receiving seat (25) defined by the cup-shaped second part (22).

5. The assembly for measuring torque and/or axial load (10) for capping heads according to claim 1, wherein the second part (22) of the interface means (20) is cup-shaped, thereby defining a receiving seat (25) for the first part (21) of the interface means (20), wherein the first part (21) of the interface means (20) is shaped as a cylindrical pin, the pin-shaped first part (21) being dimensioned so as to fit in the receiving seat (25) defined by the cup-shaped second part (22), and wherein the first part (21) and/or the second part (22) of the interface means (20) comprise a plurality of permanent magnets, arranged with alternate polarities along the ring-shaped development of an outer covering surface of the pin-shaped first part (21), and/or, respectively, of a covering surface of the cup-shaped second part (22) facing the inside of the receiving seat (25).

6. The assembly for measuring torque and/or axial load (10) for capping heads according to claim 5, wherein the first part (21) or the second part (22) of the interface means (20) comprise a permanent magnet, shaped as a hollow cylindrical ring projecting from the outer covering surface of the pin-shaped first part (21) or from the covering surface of the cup-shaped second part (22) facing the inside of the receiving seat (25), respectively.

7. The assembly for measuring torque and/or axial load (10) for capping heads according to claim 5, wherein the first part (21) or the second part (22) of the interface means (20) are made of a ferromagnetic material, subject to hysteresis friction.

8. The assembly for measuring torque and/or axial load (10) for capping heads according to claim 1, wherein the first

(21) and the second part (22) of the interface means (20) comprise reciprocal aligning means (26, 27).

9. The assembly for measuring torque and/or axial load (10) for capping heads according to claim 8, wherein the reciprocal aligning means (26, 27) comprise a centring protrusion (26) axially extending from the centre of a free head surface (21a) of the pin-shaped first part (21) and an entrance recess (27) formed in a bottom wall (25a) of the receiving seat (25), the entrance recess (27) being shaped in a complementary way with respect to the centring protrusion (26) for receiving such protrusion (26) therein.

10. The assembly for measuring torque and/or axial load (10) for capping heads according to claim 8, wherein the reciprocal aligning means (26, 27) comprise a centring protrusion (26) axially extending from the centre of a bottom wall (25a) of the receiving seat (25), and an entrance recess (27) formed in a free head surface (21a) of the pin-shaped first part (21), the entrance recess (27) being shaped in a complementary way with respect to the centring protrusion (26) for receiving such protrusion (26) therein.

* * * * *